US006999449B2

(12) United States Patent
Barna et al.

(10) Patent No.: US 6,999,449 B2
(45) Date of Patent: Feb. 14, 2006

(54) SYSTEM AND METHOD OF MONITORING AND REPORTING ACCOUNTING DATA BASED ON VOLUME

(75) Inventors: John Barna, Beaconsfield (CA); Samy Touati, Rosemere (CA); Lila Madour, Kirkland (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 873 days.

(21) Appl. No.: 09/930,666

(22) Filed: Aug. 15, 2001

(65) Prior Publication Data

US 2002/0046277 A1    Apr. 18, 2002

Related U.S. Application Data

(60) Provisional application No. 60/226,408, filed on Aug. 18, 2000.

(51) Int. Cl.
*H04L 12/56* (2006.01)

(52) U.S. Cl. ........................ 370/352; 455/406
(58) Field of Classification Search ................ 370/352; 455/406
See application file for complete search history.

(56) References Cited

U.S. PATENT DOCUMENTS

| 6,760,417 B1 * | 7/2004 | Wallenius ............... 379/114.28 |
| 2002/0006780 A1 * | 1/2002 | Bjelland et al. ............ 455/406 |
| 2002/0029189 A1 * | 3/2002 | Titus et al. .................... 705/39 |

* cited by examiner

*Primary Examiner*—Ricky Ngo
*Assistant Examiner*—Derrick W Ferris
(74) *Attorney, Agent, or Firm*—Smith, Danamraj & Youst, P.C.

(57) ABSTRACT

A system and method for monitoring and reporting a volume of data transferred between a Mobile Station (MS) and a data network during a data session. A Prepaid Server (PPS) maintains an MS account and informs a AAA Server of a predetermined volume of data that may be transferred during the session. A Packet Data Service Node (PDSN) sends interim accounting messages to the AAA Server which determines when the predetermined volume of data has been transferred, and notifies the PPS. When the account balance goes below a threshold volume, the data session is terminated. During handoff of the MS from a first PDSN to a second PDSN, a data tunnel is established between them. When the handoff is complete, the tunnel is torn down. The first PDSN reports the volume of data transferred through the tunnel to the second PDSN which reports the volume to the AAA Server.

14 Claims, 2 Drawing Sheets

SYSTEM AND METHOD OF MONITORING AND REPORTING ACCOUNTING DATA BASED ON VOLUME

PRIORITY STATEMENT UNDER 35 U.S.C. §119(e) & 37 C.F.R. §1.78

This nonprovisional application claims priority based upon the prior U.S. provisional patent application entitled, "Pre-paid Solution for CDMA 2000" application No. 60/226,408, filed Aug. 18, 2000 in the names of John Barna, Samy Touati, and Lila Madour.

BACKGROUND OF THE INVENTION

1. Technical Field of the Invention

This invention relates to telecommunication systems and, more particularly, to a volume-based system and method of monitoring and reporting accounting data in Internet Protocol (IP)-based telecommunications networks.

2. Description of Related Art

Prepaid telecommunication services are well-known. However, the emergence of packet data communications technology and the provision of packet data services raises new issues with respect to billing. Since data rates can vary greatly, conventional per minute charges are not preferred. Rather, charges should preferably be based on the volume of data (bytes/kilobytes) transferred to and from a given user engaged in a packet data session. It is therefore vitally important that the volume of data transferred for each user be monitored and reported as accurately as possible within each session.

It is particularly important to maintain an accurate count of the amount of data transferred to and from a Prepaid subscriber. Currently, the implementation of a prepaid solution for CDMA 2000 packet core networks is being investigated. The prepaid solution will introduce a prepaid service to CDMA 2000 users based on the volume of data transferred between each user and the IP network. However, existing procedures are unable to accurately report the amount of data transferred to and from mobile users during a handoff procedure, and are designed to report usage on the basis of the timed length of each call rather than the volume of data transferred.

The protocol utilized today to report accounting data from service nodes such as Packet Data Service Nodes (PDSNs) to accounting servers such as Authorization, Authentication, and Accounting (AAA) servers, is the RADIUS protocol. The RADIUS protocol utilizes Accounting-Request Interim messages today for interim accounting updates. These interim accounting updates are based on elapsed time rather than volume of data transferred, and provide cumulative information for the entire accounting session to the AAA Server. Thus, existing procedures are unable to properly control a Prepaid service that is based on the volume of data transferred in the case where a user exceeds his allotted volume.

Currently, with the RADIUS protocol, the Accounting-Request Interim messages are intermittently sent from the client PDSN to the AAA Server based on the value of an Accounting-Interim-Interval attribute returned from the AAA Server in a RADIUS Access-Accept message at the time of authentication. The time interval may also be set locally in the PDSN, and the interval returned from the AAA Server is then ignored. Obviously, the time interval only provides a way to perform accounting updates based on elapsed time. In addition, the AAA Server currently does not send a response to the PDSN in reply to these interim messages. The AAA Server only sends an Accounting-Response message to the PDSN in reply to an Accounting Request Start or Stop message. Therefore the Accounting-Request Interim messages are unidirectional from the PDSN to the AAA Server with regard to accounting. This is unacceptable for proper control of a Prepaid data session (i.e., to terminate the session when predetermined criteria are met).

The first revision of IS-835 introduced the concept of an accounting stop record trigger. An accounting stop record trigger is used to close an accounting session with an Accounting Stop message when the accounting record exceeds a configurable threshold size, or at any other threshold that an implementation dictates. If the applicable data session is continuing in the same PDSN, the Accounting Stop message is immediately followed by an Accounting Start message which begins another accounting session. The two accounting sessions are then correlated with a Correlation-ID.

For mobile users being handed off from an old (serving) PDSN to a new (target) PDSN, additional complexity is added to the accounting procedure. A proposal has been made to increase the speed at which handoff of a Mobile Station (MS) occurs between two PDSNs during Mobile IPv4 sessions. In the proposed fast handoff procedure, the MS is permitted to resume sending and receiving data before it has completed all of the necessary establishment procedures in the new PDSN. In the concept of Mobile IP, the MS maintains its IP address so it is always reachable, even if located in a different PDSN. Therefore, a tunnel is established between the old PDSN and the new PDSN, and any data packet destined for the MS during the handoff procedure is sent through the tunnel until the MS has successfully registered in the new PDSN, and the tunnel is torn down.

During the handoff, a release procedure from the radio access network dictates the release of all the connections to the MS from the old PDSN, and therefore dictates the closing of the accounting multi-session by sending a final Accounting Stop message from the old PDSN to the AAA Server. The new PDSN starts a new accounting session when several criteria are met: the MS sends a Mobile IP registration message, the MS is authenticated by the new PDSN, and the MS successfully registers with the Home Agent (HA). The new accounting session can be correlated with the old accounting session, but there is no way to account for any additional data that may have been sent to the MS through the tunnel during the handoff procedure. Additional packets may continue to be tunneled from the old PDSN to the new PDSN since the MS may still not have successfully registered with the HA in the new PDSN. Since tunneled traffic for the MS was sent or received after the accounting session was terminated in the old PDSN and prior to opening a new accounting session in the new PDSN, this traffic is not currently accounted for. The volume of data transferred needs to be considered for accounting purposes. For Prepaid users it is particularly important to maintain accurate accounting data in relation to their volume usage since this is the basis on which they are charged, and additional volume is purchased.

In order to overcome the disadvantage of existing solutions, it would be advantageous to have a system and method of monitoring and reporting accounting data in IP-based telecommunications networks that is based on volume, and accurately tracks the amount of data transferred during the handoff of an MS. The present invention provides such a system and method.

SUMMARY OF THE INVENTION

In one aspect, the present invention is a system for monitoring and reporting a volume of data transferred between an end user and a data network during a data session. The system includes a Network Access Server (NAS) that provides the end user with access to the data network, and an accounting server in communication with the NAS that maintains accounting records for the network. The accounting server may include a Prepaid Server (PPS) function that maintains an account balance for the end user comprising a volume of data that the end user is authorized to transfer. The PPS function may also be implemented as a separate node in communication with the accounting server. During setup of the data session, the PPS function informs the accounting server of a predetermined volume of data that the end user may transfer during the session. The NAS monitors the volume of data transferred between the end user and the data network during the data session, and sends interim accounting messages to the accounting server. Each interim accounting message reports the cumulative volume of data transferred during the data session prior to sending the interim accounting message. The accounting server receives the interim accounting messages from the NAS, determines when the predetermined volume of data has been transferred, and notifies the PPS function that the predetermined volume of data has been transferred. The PPS function notifies the accounting server when the account balance for the end user goes below a threshold volume of data, and the accounting server then notifies the NAS that the data session should be terminated.

In another aspect, the present invention is a method of monitoring and reporting a volume of data transferred between an end user and a data network having a NAS, and an accounting server in communication with the NAS. The accounting server may include a PPS function. The method includes the steps of maintaining by the PPS function, an account balance for the end user comprising a volume of data that the end user is authorized to transfer; providing the end user with access to the data network through the NAS; and sending an access accept message from the PPS function to the accounting server during setup of the data session, the access accept message indicating a predetermined volume of data that the end user may transfer during the data session. The NAS then monitors the volume of data transferred between the end user and the data network during the data session, and sends interim accounting messages to the accounting server reporting the cumulative volume of data transferred during the data session prior to sending the interim accounting message. The PPS function is then notified by the accounting server that the predetermined volume of data has been transferred. This is followed by notifying the accounting server by the PPS function, that the account balance for the end user has gone below a threshold volume of data; and notifying the NAS by the accounting server, that the data session should be terminated. Alternatively, a new predetermined volume of data may be returned to the NAS. The NAS monitors this predetermined volume until it expires, or the user terminates the session. The NAS reports the usage to the accounting server and, in turn, the PPS function.

In yet another aspect, the present invention is a method of monitoring and reporting a volume of data transferred between a mobile station (MS) and a data network during a handoff procedure in which the MS is handed off from a first Packet Data Service Node (PDSN-1) to a second Packet Data Service Node (PDSN-2) during a data session. The method includes the steps of establishing the data session through PDSN-1; sending a handoff request from PDSN-2 to PDSN-1; and stopping by PDSN-1, a first accounting session between PDSN-1 and an accounting server. This is followed by establishing a data tunnel, such as a Point-to-Point Protocol (PPP) connection, between PDSN-1 and PDSN-2; passing data from PDSN-1 through the data tunnel to the MS during the handoff procedure, and monitoring by PDSN-1 the volume of data being passed through the tunnel. When the handoff procedure is completed, PDSN-2 requests that the tunnel be torn down. This is followed by sending from PDSN-1 to PDSN-2, an indication of the volume of data that was passed through the tunnel during the handoff procedure; starting by PDSN-2, a second accounting session between PDSN-2 and the accounting server; and sending from PDSN-2 to the accounting server, the indication of the volume of data that was passed through the tunnel during the handoff procedure.

In still yet another aspect, the present invention is a system for monitoring and reporting a volume of data transferred between an MS and a data network during a handoff procedure in which the MS is handed off from a first PDSN (PDSN-1) in which the session is established, to a second PDSN (PDSN-2) which sends a handoff request to PDSN-1 during a data session. The system includes an accounting server in the data network that monitors a series of accounting sessions during the data session; and an accounting stop mechanism within PDSN-1 that stops a first accounting session between PDSN-1 and the accounting server when PDSN-1 receives the handoff request from PDSN-2. The system also includes a tunneling setup mechanism that establishes a data tunnel between PDSN-1 and PDSN-2, and passes data from PDSN-1 through the data tunnel to the MS during the handoff procedure. A tunnel tear-down mechanism tears down the tunnel when requested by PDSN-2, as the handoff procedure is completed. The system also includes a data monitoring mechanism within PDSN-1 that monitors the volume of data passed through the tunnel, and sends from PDSN-1 to PDSN-2, an indication of the volume of data that was passed through the tunnel during the handoff procedure. An accounting start mechanism in PDSN-2 starts a second accounting session between PDSN-2 and the accounting server when the indication of the volume of data that was passed through the tunnel is received from PDSN-1. Finally, the system includes an accounting communication mechanism in PDSN-2 that sends from PDSN-2 to the accounting server, the indication of the volume of data that was passed through the tunnel during the handoff procedure.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF EMBODIMENTS

Figure 1:
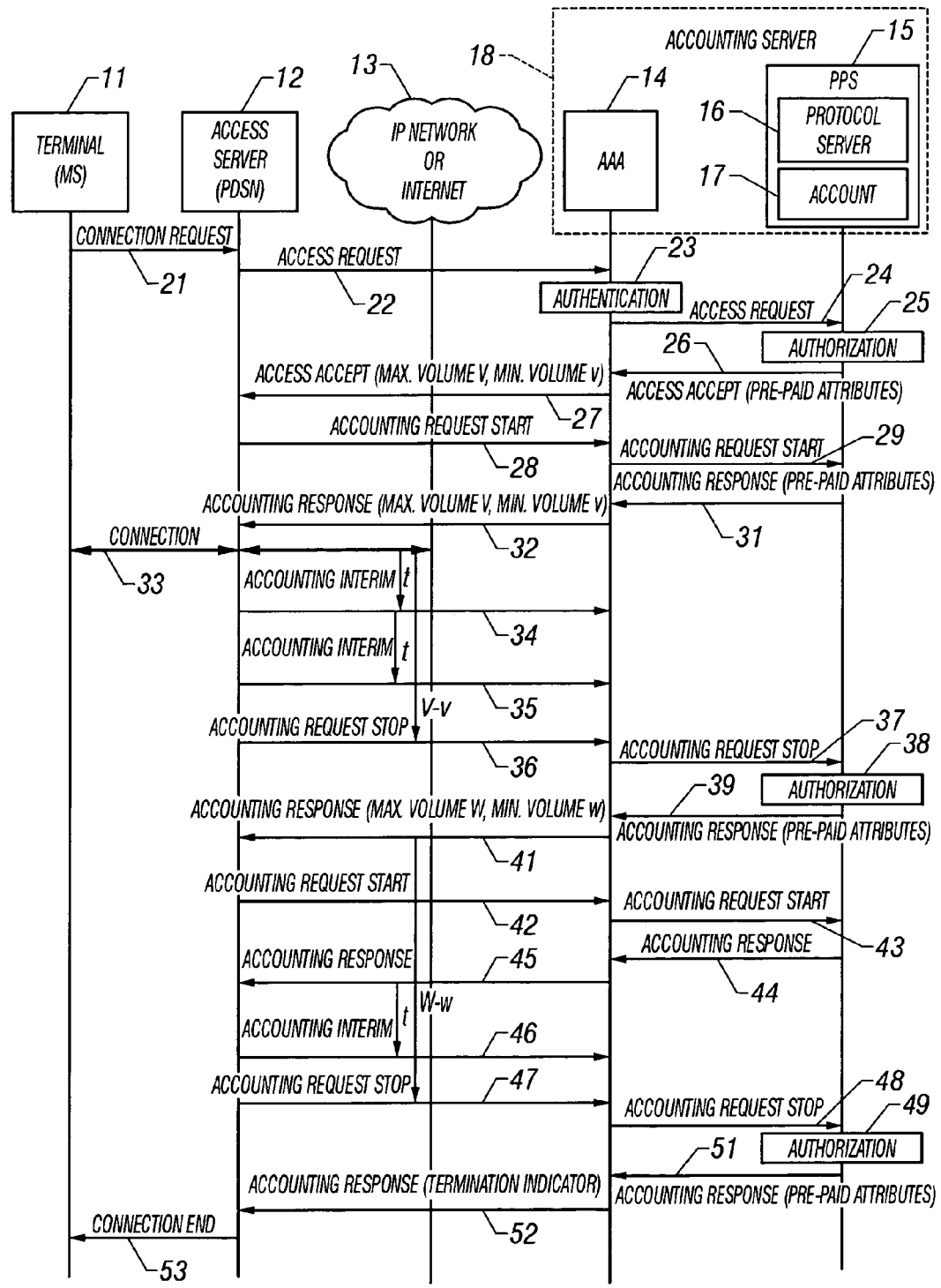
FIG. 1 is a signaling diagram illustrating the flow of messages between access and accounting nodes and an IP network when implementing a method of accounting based on the expiry of a predetermined volume of data transferred utilizing the stop record trigger.

In order to implement a solution that charges a Prepaid subscriber based on volume, in addition to performing cumulative updates based on time intervals, it is necessary to control and monitor the volume of data transferred for each user as accurately as possible. (The volume transferred can be both to or from the network). There are a number of ways to implement a trigger for sending accounting data to the AAA Server based on volume usage:

Set an interim volume locally in the PDSN. An accounting message is triggered when the user consumes a data volume equal to the interim volume. Accounting data is sent from the PDSN to the AAA Server in an Interim accounting message, and no reply message is returned from the AAA Server.

Set the interim volume in the AAA Server, and return the interim volume to the PDSN in the RADIUS Access-Accept message at authentication. An Interim accounting message is triggered when the user consumes a data volume equal to the interim volume. Accounting data is sent from the PDSN to the AAA Server in an Interim accounting message, and no reply message is returned from the AAA Server.

An alternate method to these described above is to return from the AAA Server in the Access-Accept message, a first attribute indicating the maximum volume of data permitted for the user, and a second attribute indicating a threshold volume that signifies a trigger point for the sending of an Accounting Stop message. These new attributes are also introduced in the Accounting Response message, which is sent from the AAA Server to the PDSN in reply to an Accounting Stop, or Accounting Start message.

Functionality for a Prepaid Server (PPS) may be implemented within the AAA Server to form a node referred to herein as an "accounting server", or in a separate node in communication with the AAA Server. The PPS keeps track of the volume of data that the Prepaid subscriber has available in his account, and controls the session to ensure that the subscriber does not exceed the volume of data available. The PDSN then monitors the volume of data handled for the Prepaid subscriber in a particular packet data session, and when the volume threshold is reached, the PDSN sends an Accounting Stop message to the AAA Server. The AAA Server or PPS replies to the Accounting Stop message with an Accounting Response message. The Accounting Response message contains a new maximum volume allowed for the subscriber (taking into account the volume already utilized), and a new threshold volume at which a subsequent Accounting Stop message is to be triggered.

This process may be repeated until the Prepaid subscriber exhausts his account, or purchases additional volume. If the subscriber purchases additional volume, this mechanism provides the PDSN with an opportunity to report the volume of data used, and to be updated with the new volume in the subscriber's account balance.

The present invention provides a mechanism to trigger a message from the PPS to the Prepaid subscriber to warn the subscriber of a possible exhaustion of credit or account balance and the need to purchase additional units. Additionally, it provides a mechanism to provide the most up to date account balance to the PDSN which is monitoring the subscriber's balance during the ongoing session. It also provides a method for implementing a stop record trigger for CDMA 2000 based on volume used.

FIG. 1 is a signaling diagram illustrating the flow of messages between access and accounting nodes and an IP network when implementing a method of accounting based on the expiry of a predetermined volume of data transferred utilizing the stop record trigger. A terminal such as an MS 11 utilized by a Prepaid subscriber uses a Network Access Server (NAS) such as a PDSN 12 to access the IP network or Internet 13. An AAA Server 14 performs authorization, authentication, and accounting services. Functionality for a Prepaid Server (PPS) 15 may be implemented within the AAA Server to form an Accounting Server 18, or in a separate node in communication with the AAA Server. The PPS includes a Protocol Server 16 and an Account 17 for the Prepaid subscriber. The PPS keeps track of the volume of data that the Prepaid subscriber has available in his Account, and controls the session to ensure that the subscriber does not exceed the volume of data available.

At 21, the MS 11 sends a Connection Request message to the PDSN 12. At 22, the PDSN sends an Access Request message to the AAA Server 14 which performs an authentication of the MS at 23. Upon positively authenticating the MS, the AAA Server forwards the Access Request message at 24 to the PPS 15. The PPS performs an authorization process at 25, determining the Prepaid attributes for the Prepaid subscriber. The Prepaid attributes are then returned to the AAA Server in an Access Accept message 26. At 27, the AAA Server then sends an Access Accept message to the PDSN 12, and includes a first attribute indicating the maximum volume of data permitted for the user (Max. Volume "V"), and a second attribute indicating a threshold volume (Min. Volume "v") that signifies a trigger point for the sending of an Accounting Stop message.

At 28, the PDSN 12 sends an Accounting Request Start message to the AAA Server 14, and the AAA Server forwards the message to the PPS 15 at 29. The PPS responds to the AAA Server with an Accounting Response message 31, and includes the Prepaid attributes. The AAA Server forwards the Accounting Response message to the PDSN at 32, indicating the maximum volume "V" permitted for the user, and the threshold volume (Min. Volume "v") signifying the trigger point for the sending of an Accounting Stop message. The PDSN then makes a Connection 33 between the MS 11 and the IP Network or Internet 13, and the session begins. Periodically, Accounting Interim messages 34 and 35 may be sent from the PDSN to the AAA Server reporting, at time interval "t", the volume of data utilized since the start of the accounting session. The time interval may be determined locally in the PDSN or may be returned to the PDSN from the AAA Server in the Access Accept message 27. At 36, the PDSN sends an Accounting Request Stop message to the AAA Server when the PDSN calculates that the volume of data transferred in the session (V−v) has reduced the amount of data available in the Prepaid subscriber's Account to the threshold volume (v). The AAA Server, in turn, sends the Accounting Request Stop message to the PPS at 37 which performs an additional authorization process at 38.

At this point, the PPS 15 may send a message to the Prepaid subscriber warning the subscriber of a possible exhaustion of credit or account balance and the need to purchase additional units. The subscriber may purchase additional volume, or the PPS may merely calculate a new maximum volume "W" allowed for the subscriber (taking into account the volume already utilized), and a new threshold volume "w" at which a subsequent Accounting Stop message is to be triggered. These volumes are returned to the AAA Server 14 as Prepaid attributes in an Accounting Response message 39, and the AAA Server forwards the attributes to the PDSN 12 in an Accounting Response message 41.

The PDSN then begins a new accounting session by sending an Accounting Request Start message 42 to the AAA Server 14, and the AAA Server forwards the message to the PPS 15 at 43. The PPS responds to the AAA Server with an Accounting Response message 44, and the AAA Server forwards the Accounting Response message to the PDSN at 45. At 46, an Accounting Interim message may be sent from the PDSN to the AAA Server reporting at time interval "t", the volume of data utilized since the start of the accounting session. At 47, the PDSN sends an Accounting Request Stop message to the AAA Server when the PDSN calculates that the volume of data transferred in the session (W−w) has reduced the amount of data available in the Prepaid subscriber's Account to the new threshold volume (w). The AAA Server, in turn, sends the Accounting Request Stop message to the PPS at 48 which performs an additional authorization process at 49.

As a result of the authorization process at 49, the PPS may determine that the Prepaid subscriber has utilized all of his available volume, and his Account 17 is now depleted. In this case, the PPS sends an Accounting Response message 51 to the AAA Server 14 and includes Prepaid attributes indicating that the Prepaid subscriber's Account is depleted. At 52, the AAA Server sends an Accounting Response message to the PDSN 12 with a Termination Indicator indicating that the session should be terminated. The PDSN then ends the Connection at 53.

This framework for accounting reporting based on volume to satisfy a Prepaid solution for packet data may also be applicable to other packet data networks where access is made via a Network Access Server (NAS) and an AAA Server exists in the network architecture. The Prepaid functionality may be contained in the AAA Server or in another node functioning as a PPS. This framework can be supported by other protocols, and is not restricted to the RADIUS protocol.

During a handoff of a Prepaid mobile subscriber, it is important that the balance of volume remaining in the Prepaid subscriber's account continue to be accurately monitored and reported. This is especially a concern when the handoff is an inter-PDSN handoff. In this situation, a tunnel is established to connect the two implicated PDSNs for the carrying of packets during the handoff procedure. It is possible that packets may be communicated by the old PDSN through the tunnel after the accounting session is terminated in the old PDSN but before the accounting session in the new PDSN is established. In order to ensure accuracy of the Prepaid account balance, this volume of tunneled data must be monitored and reported.

The prior art conventionally sets up an A10 connection following an access specific layer 2 handoff (CDMA 2000, 3GPP2/IS2001 Specifications). This contributes a significant delay. To address this concern, and hence reduce the delay level, a proposed fast handoff procedure sets up the A10 connection earlier in the handoff process and preferably before the issuance of the handoff command from the old (serving) PDSN. More particularly, the pre-setup of the A10 connection is accomplished after the target Base Station Controller (BSC) responds to the PDSN handoff request with an A9-Setup-A8 message. Pre-setup of the A10 connection provides the new (target) PDSN with the address of the old PDSN. The new PDSN then makes a handoff solicitation to the old PDSN. Responsive thereto, the old PDSN provides all the security, mobility, and PPP context information relating to the subscriber.

Transfer of the PPP context information obviates the need to renegotiate the PPP link at the new PDSN following handoff and minimizes delay of link layer establishment. The address of the new PDSN is provided to the old PDSN in connection with the A9-AL disconnect to stop packet transmission to the old BSC in the radio access network, and this address is used to establish a path to tunnel the packets to the new PDSN. Following mobile station handoff, an A9-AL connect message is provided to trigger the resumption of packet data transmission using the PDSN-to-PDSN tunnel.

An issue of importance in the handoff scenario revolves around the timing of the Accounting Stop message transmission by the old PDSN. Before the new PDSN sends an Accounting Start message, it requests that the tunnel be torn down. According to the present invention, the old PDSN responds by sending to the new PDSN, volume counter information representing the amount of data tunneled during the handoff process. The old PDSN may then generate an Accounting Stop message. This tunneled volume information is then included by the new PDSN in a new accounting attribute contained in the Accounting Start message sent to the AAA Server. The new accounting attribute indicates "prepaid volume due to mobility" or "data tunneled during handoff" and the address of the old PDSN. The address of the old PDSN is included in case events need to be correlated for auditing purposes. The AAA Server or PPS may also use the address of the old PDSN to match it with the PDSN address of the last Accounting Stop message for verification purposes.

Prior to sending the Accounting Response message from the AAA Server to the client PDSN, the AAA server or PPS may update the Prepaid subscriber's account balance by deducting the data tunneled during handoff from the account balance. This information is also used to calculate the maximum volume of data the Prepaid subscriber is permitted to communicate, and the threshold volume of data that signifies the trigger point for the sending of an additional Accounting Stop message by the PDSN. New attributes are included in the Accounting Response message to carry this information to the PDSN.

Figure 2:
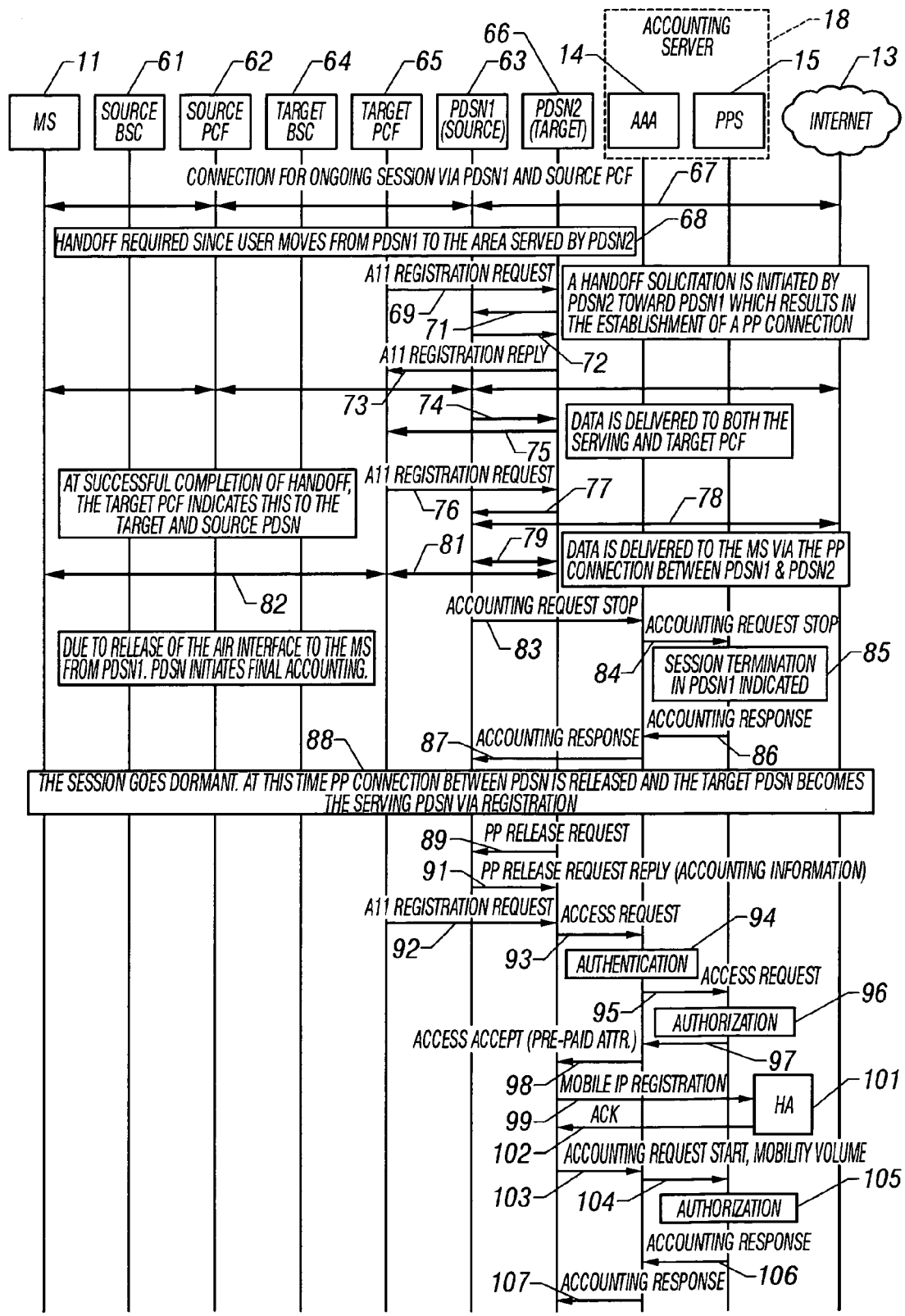
FIG. 2 is a signaling diagram illustrating the flow of messages between access and accounting nodes and an IP network when accurately accounting for data transferred during an inter-PDSN handoff of a mobile station.

FIG. 2 is a signaling diagram illustrating the flow of messages between access and accounting nodes and an IP network when accurately accounting for data transferred during an inter-PDSN handoff of a mobile station. The MS 11, Internet 13, AAA Server 14, PPS 15, and Accounting Server 18 are as shown and described in FIG. 1. A Source Base Station Controller (BSC) 61 and a Source Packet Control Function (PCF) 62 are associated with a Source PDSN-1 63. Likewise, a Target BSC 64 and a Target PCF 65 are associated with a Target PDSN-2 66.

At the beginning of FIG. 2, the MS 11 is engaged in a packet data session via the Internet 13. A connection 67 is established between the MS, the Source PCF 62, and the Source PDSN-1 63. At 68, it is determined that an inter-PDSN handoff is required because, for example, the MS moves from the service area of PDSN-1 into the service area of the Target PDSN-2 66. The Target PCF 65 then sends an All Registration Request message 69 to PDSN-2. At 71, a handoff solicitation is initiated by PDSN-2 toward PDSN-1 which results in the establishment of a Point-to-Point Protocol (PPP) connection at 72. PDSN-2 then sends an All Registration Reply 73 to the Target PCF. At this point, the connection 67 between the MS, the Source PCF, and PDSN-1 is enhanced by delivering data to both the Source PCF and the Target PCF. As shown at 74, a connection is established between PDSN-1 and PDSN-2, and at 75, a connection is established between PDSN-2 and the Target PCF.

At successful completion of the handoff, the Target PCF 65 indicates this to the Target PDSN-2 66 in an All Registration Request message 76. The Target PDSN-2, in turn, forwards this indication at 77 to the Source PDSN-1 63. While PDSN-1 retains the connection to the Internet at 78, data is delivered to the MS 11 via the PP connection 79 between PDSN-1 and PDSN-2, via the connection 81 between PDSN-2 and the Target PCF 65, and via the connection 82 between the Target PCF and the MS.

An Accounting Request Stop message 83 is then sent from the Source PDSN-1 63 to the AAA Server 14. At 84, the AAA Server forwards the Accounting Request Stop message to the PPS 15 where it is indicated at step 85 that the session has terminated in PDSN-1. At 86, the PPS sends an Accounting Response message to the AAA Server which forwards the Accounting Response message to PDSN-1 at 87.

At step 88, the session goes dormant. The PP connection between PDSN-1 and PDSN-2 is released by sending a PP Release Request message 89 from PDSN-2 to PDSN-1. At 91, a PP Release Request Reply message is sent from PDSN-1 to PDSN-2 with accounting information relating to the volume of data transferred over the PP connection during the handoff procedure (i.e., mobility volume). The Target PCF 65 then sends an All Registration Request message 92 to PDSN-2, and PDSN-2 sends an Access Request message 93 to the AAA Server. PDSN-2 thus becomes the serving PDSN. At 94, the AAA Server 14 performs an authentication of the MS. Upon positively authenticating the MS, the AAA Server forwards the Access Request message at 95 to the PPS 15. The PPS performs an authorization process at 96, determining the Prepaid attributes for the Prepaid subscriber. The Prepaid attributes are then returned to the AAA Server in an Access Accept message 97. At 98, the AAA Server then sends an Access Accept message to PDSN-2, and includes the Prepaid attributes. As described above, the attributes may include a first attribute indicating the maximum volume of data permitted for the user (Max. Volume "V"), and a second attribute indicating a threshold volume (Min. Volume "v") that signifies a trigger point for the sending of an Accounting Stop message.

The Target PDSN-2 66 then sends a Mobile IP Registration message 99 to a Home Agent (HA) 101 which returns an Acknowledgment message 102. The PDSN-2 then sends an Accounting Request Start message 103 to the AAA Server 14 which forwards the Start message to the PPS 15 at 104. The Accounting Request Start message includes the volume of data transferred during the handoff procedure (i.e., mobility volume), as reported in the PP Release Request Reply message at step 91. At step 105, the PPS performs an Authorization procedure to determine whether the end user is still authorized to proceed with the session after the mobility volume is accounted for. An Accounting Response message 106 is then returned to the AAA Server which forwards the Accounting Response message to PDSN-2 at 107.

Although the new accounting attributes are described herein as being added to RADIUS messages, other protocols could also be used as long as the data is passed between the PDSN and a local accounting memory or a node that collects accounting data. The PPS can then be notified that an additional amount of data was tunneled to the MS during the time that it took to perform the handoff.

It is thus believed that the operation and construction of the present invention will be apparent from the foregoing description. While the method, apparatus and system shown and described has been characterized as being preferred, it will be readily apparent that various changes and modifications could be made therein without departing from the scope of the invention as defined in the following claims.

What is claimed is:

1. A system for monitoring and reporting a volume of data transferred between an end user and a data network during a data session, said system comprising:
    a Network Access Server (NAS) that provides the end user with access to the data network; and
    an accounting server in communication with the NAS that maintains accounting records for the network, said accounting server including a Prepaid Server (PPS) function that maintains an account balance for the end user comprising a volume of data that the end user is authorized to transfer, said PPS function informing the accounting server, during setup of the data session, of a predetermined volume of data that the end user may transfer during the session;
    said NAS monitoring the volume of data transferred between the end user and the data network during the data session, and sending interim accounting messages during the session to the accounting server, each interim accounting message reporting a cumulative volume of data transferred during the data session prior to sending the interim accounting message;
    said accounting server receiving the interim accounting messages from the NAS, determining when the predetermined volume of data has been transferred, and notifying the PPS function when the predetermined volume of data has been transferred;
    said PPS function notifying the accounting server when the account balance for the end user goes below a threshold volume of data; and
    said accounting server notifying the NAS that the data session should be terminated when the accounting server Is notified that the account balance for the end user has gone below the threshold volume of data.

2. The system of claim 1 wherein the PPS function is implemented in a standalone Prepaid Server (PPS) in communication with the accounting server.

3. The system of claim 2 wherein the PPS informs the accounting server of a predetermined volume of data that the end user may transfer during the session such that when the accounting server notifies the PPS that the predetermined volume of data has been transferred, there is still a sufficient volume remaining in the end user's account for the session to continue while the PPS notifies the end user to purchase additional data volume.

4. The system of claim 2 wherein the PPS informs the accounting server of a predetermined volume of data that the end user may transfer during the session such that when the accounting server notifies the PPS that the predetermined volume of data has been transferred, there is still a sufficient volume remaining in the end user's account for the session to continue, and the PPS informs the accounting server of a second predetermined volume of data that the end user may transfer during the session.

5. The system of claim 1 wherein the accounting server also informs the NAS of a triggering volume of data that triggers the NAS to send an accounting stop message to the accounting server.

6. The system of claim 1 wherein the end user is a mobile station, and the NAS is a Packet Data Service Node (PDSN).

7. During a data session, a method of monitoring and reporting a volume of data transferred between an end user and a data network having a Network Access Server (NAS), and an accounting server in communication with the NAS, said accounting server including a Prepaid Server (PPS) function, said method comprising the steps of:
- maintaining by the PPS function, an account balance for the end user comprising a volume of data that the end user is authorized to transfer;
- providing the end user with access to the data network through the NAS;
- sending an access accept message from the PPS function to the accounting server during setup of the data session, said access accept message indicating a predetermined volume of data that the end user may transfer during the data session,
- monitoring by the NAS, the volume of data transferred between the end user and the data network during the data session;
- sending from the NAS to the accounting server, a series of interim accounting messages during the data session, each interim accounting message reporting a cumulative volume of data transferred during the data session prior to sending the interim accounting message;
- notifying the PPS function by the accounting server, that the predetermined volume of data has been transferred;
- notifying the accounting server by the PPS function, that the account balance for the end user has gone below a threshold volume of data; and
- notifying the NAS by the accounting server, that the data session should be terminated when the accounting server is notified that the account balance for the end user has gone below the threshold volume of data.

8. The method of claim 7 wherein the PPS function is implemented in a standalone Prepaid Server (PPS) in communication with the accounting server.

9. The method of claim 7 further comprising, after the step of notifying the PPS function by the accounting server, that the predetermined volume of data has been transferred, the steps of:
- determining by the PPS function whether there is still a sufficient volume remaining in the end user's account for the session to continue; and
- offering the end user an option to purchase additional data volume, upon determining that there is still a sufficient volume remaining in the end user's account for the session to continue.

10. The method of claim 7 further comprising, after the step of notifying the PPS function by the accounting server, when the predetermined volume of data has been transferred, the steps of:
- determining by the PPS function whether there is still a sufficient volume remaining in the end user's account for the session to continue; and
- informing the accounting server by the PPS function, of a subsequent predetermined volume of data that the end user may transfer during the session, upon determining that there is still a sufficient volume remaining in the end user's account for the session to continue.

11. The method of claim 7 wherein the step of sending an access accept message from the PPS function to the accounting server also includes sending an indication of a triggering volume of data, said method further comprising the steps of:
- sending the indication of the triggering volume of data to the NAS;
- determining by the NAS whether the volume of data transferred equals the triggering volume of data; and
- sending an accounting stop message from the NAS to the accounting server upon determining that the volume of data transferred equals the triggering volume of data.

12. The method of claim 7, for monitoring and reporting a volume of data transferred between a mobile station (MS) and the data network during a handoff procedure in which the MS is handed off from a first Packet Data Service Node (PDSN-1) to a second Packet Data Service Node (PDSN-2) during a data session, said method comprising the steps of:
- establishing the data session through PDSN-1;
- sending a handoff request from PDSN-2 to PDSN-1;
- stopping by PDSN-1, a first accounting session between PDSN-1 and the accounting server;
- establishing a data tunnel between PDSN-1 and PDSN-2, wherein the step of establishing a data tunnel between PDSN-1 and PDSN-2 includes establishing a Point-to-Point Protocol PPP connection between PDSN-1 and PDSN-2;
- passing data from PDSN-1 through the data tunnel to the MS during the handoff procedure, PDSN-1 monitoring the volume of data being passed through the tunnel;
- requesting by PDSN-2, that the tunnel be torn down when the handoff procedure is completed;
- sending from PDSN-1 to PDSN-2, an indication of the volume of data that was passed through the tunnel during the handoff procedure;
- starting by PDSN-2, a second accounting session between PDSN-2 and the accounting server; and
- sending from PDSN-2 to the accounting server, the indication of the volume of data that was passed through the tunnel during the handoff procedure, wherein the NAS is the second PDSN-2, the Prepaid Server (PPS) function is in communication with the accounting server that maintains an account balance for the MS that indicates the maximum volume, and the method further comprises the steps of:
- sending an access request message from the accounting server to the PPS, said access request message including the indication of the volume of data that was passed through the tunnel during the handoff procedure; and
- determining by the PPS, a new maximum volume of data that the MS may transfer during the data session by subtracting the volume of data that was passed through the tunnel from the maximum volume of data that the MS may transfer and wherein said access accept message is indicating the new maximum volume.

13. A Network Access Server (NAS) adapted to provide an end user with access to a data network in a system for monitoring and reporting a volume of data transferred between the end user and the data network during a data session, said system comprising an accounting server in communication with the NAS that maintains accounting records for the network, said accounting server including a Prepaid Server (PPS) function that maintains an account balance for the end user comprising a volume of data that the end user is authorized to transfer, said PPS function informing the accounting server, during setup of the data session, of a predetermined volume of data that the end user may transfer during the session;
- said NAS being adapted to monitor the volume of data transferred between the end user and the data network during the data session, and to send interim accounting messages during the session to the accounting server, each interim accounting message reporting a cumulative volume of data transferred during the data session prior to sending the interim accounting message;

said accounting server receiving the interim accounting messages from the NAS, determining when the predetermined volume of data has been transferred, and notifying the PPS function when the predetermined volume of data has been transferred;

said PPS function notifying the accounting server when the account balance for the end user goes below a threshold volume of data; and the NAS being adapted to receive a notification from the accounting server that the data session should be terminated when the accounting server is notified that the account balance for the end user has gone below the threshold volume of data.

14. An accounting server for a system for monitoring and reporting a volume of data transferred between an end user and a data network during a data session, said system comprising a Network Access Server (NAS) that provides the end user with access to the data network; wherein the accounting server in communication with the NAS that maintains accounting records for the network, said accounting server including a Prepaid Server (PPS) function that is adapted to maintain an account balance for the end user comprising a volume of data that the end user is authorized to transfer, said PPS function being adapted to inform the accounting server, during setup of the data session, of a predetermined volume of data that the end user may transfer during the session;

the accounting server being adapted to receive interim accounting messages during the session from said NAS, the NAS monitoring the volume of data transferred between the end user and the data network during the data session, each interim accounting message reporting a cumulative volume of data transferred during the data session prior to sending the interim accounting message;

said accounting server receiving the interim accounting messages from the NAS, determining when the predetermined volume of data has been transferred, and notifying the PPS function when the predetermined volume of data has been transferred;

said PPS function being adapted to notify the accounting server when the account balance for the end user goes below a threshold volume of data; and said accounting server being adapted to notify the NAS that the data session should be terminated when the accounting server is notified that the account balance for the end user has gone below the threshold volume of data.

* * * * *